United States Patent [19]
Jain

[11] Patent Number: 5,164,730
[45] Date of Patent: Nov. 17, 1992

[54] METHOD AND APPARATUS FOR DETERMINING A CROSS-RANGE SCALE FACTOR IN INVERSE SYNTHETIC APERTURE RADAR SYSTEMS

[75] Inventor: Atul Jain, Westchester, Calif.

[73] Assignee: Hughes Aircraft Company, Los Angeles, Calif.

[21] Appl. No.: 783,304

[22] Filed: Oct. 28, 1991

[51] Int. Cl.$^5$ .............................................. G01S 13/90
[52] U.S. Cl. ........................................ 342/25; 342/196
[58] Field of Search ........................ 342/25, 195, 196

[56] References Cited

U.S. PATENT DOCUMENTS

| | | | |
|---|---|---|---|
| H741 | 2/1990 | Powell et al. | 342/25 |
| 4,794,395 | 12/1988 | Cindrich et al. | 342/424 |
| 4,851,848 | 7/1989 | Wehner | 342/25 |
| 4,908,625 | 3/1990 | Anthouard et al. | 342/25 |
| 4,924,229 | 5/1990 | Eichel et al. | 342/25 |
| 4,929,950 | 5/1990 | Freeman et al. | 342/25 |
| 4,963,877 | 10/1990 | Wood et al. | 342/25 |
| 4,978,960 | 12/1990 | Newcomb et al. | 342/25 |
| 4,985,704 | 1/1991 | Smith | 342/25 |
| 4,999,635 | 3/1991 | Niho | 342/25 |
| 5,021,789 | 6/1991 | Shaw | 342/25 |
| 5,059,966 | 10/1991 | Fujisaka et al. | 342/25 |
| 5,061,931 | 10/1991 | Farina et al. | 342/25 |

Primary Examiner—John B. Sotomayor
Attorney, Agent, or Firm—Leonard A. Alkov; Wanda K. Denson-Low

[57] ABSTRACT

Apparatus and methods for estimating the cross-range scale factor for a displayed inverse synthetic aperture radar image using received image data. The image data is first converted into a polar format. The image data is then processed by a two-dimensional Fourier transform filter to produce a plurality of image entropy estimates. The best image entropy estimate is selected, and then a cross-range scale factor is computed from the data associated with this estimate. This cross-range scale factor is then displayed on a display, from which an operator can accurately determine the size of target objects imaged by the radar. This, in turn provides for identification of the target objects. More specifically, by using polar-format processing, and by selecting the best image obtained for assumed values of rotation rate of a target object, an accurate estimate of the cross-range scale factor is obtained. The present method enables estimation of the length of a target object from it's image and thus provides for rapid identification of the object using the displayed length estimate.

6 Claims, 4 Drawing Sheets

METHOD AND APPARATUS FOR DETERMINING A CROSS-RANGE SCALE FACTOR IN INVERSE SYNTHETIC APERTURE RADAR SYSTEMS

BACKGROUND

The present invention relates generally to inverse synthetic aperture radars, and more particularly, to apparatus and methods of determining a displayable cross-range scale factor that is indicative of the relative size of objects imaged by such radars.

Electronic imaging and scanning systems, and in particular, inverse synthetic aperture radar systems, are generally discussed in "Electronic Imaging and Scanning System," Applied Optics, 16, p. 550, March 1977, and U.S. Pat. No. 4,164,788, entitled "Super-Resolution Imaging System," issued to Atul Jain. One use of air-to-ground modes of an inverse synthetic aperature radar system is for ship detection and identification. Identification of ships and other vessels contained in an inverse synthetic aperture radar (ISAR) image has not been very accurate. This is the case, because a technique for estimating cross-range scale factor has not been available. To date, no known technique for determining the cross-range scale factor of an ISAR image has been available, since the rotation rate of a target object is not a measurable quantity.

Consequently, a technique to determine a cross-scale range factor that is indicative of the relative size of objects imaged by the radar system would be an improvement in the inverse synthetic aperature radar art. Furthermore, a technique to determine the true-length of a ship or other vessel from an ISAR image would be a substantial contribution to the vessel identification art, since knowledge of true length would eliminate a substantial number of candidate ship classes in the identification process.

Accordingly, it would be an improvement in the inverse synthetic aperture radar art to have a technique for providing a cross-scale range factor that is indicative of the relative size of target objects imaged by an inverse synthetic aperture radar system.

SUMMARY OF THE INVENTION

In order to achieve the above improvements, the present invention provides for apparatus and methods for measuring and estimating a cross-range scale factor for a displayed inverse synthetic aperture radar (ISAR) image using received ISAR signal data. The signal data is converted into a polar format. The signal data is then processed by a two-dimensional Fourier transform filter to produce a plurality of image entropy estimates. Alternatively, other criteria may be employed. The best image entropy estimate is selected, and then a cross-range scale factor is computed from the data associated with the best estimate. This cross-range scale factor is then displayed, and from which an operator can accurately determine the size of objects imaged by the radar. This, in turn provides for identification of the target objects viewed on the display.

More specifically, by using polar-format processing, and by selecting the best image obtained for assumed values of rotation rate of a target object, an accurate estimate of the cross-range scale factor is obtained. The present apparatus and method enables estimation of the length of a target object from it's image and thus provides for rapid identification of the object using the displayed length estimate.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
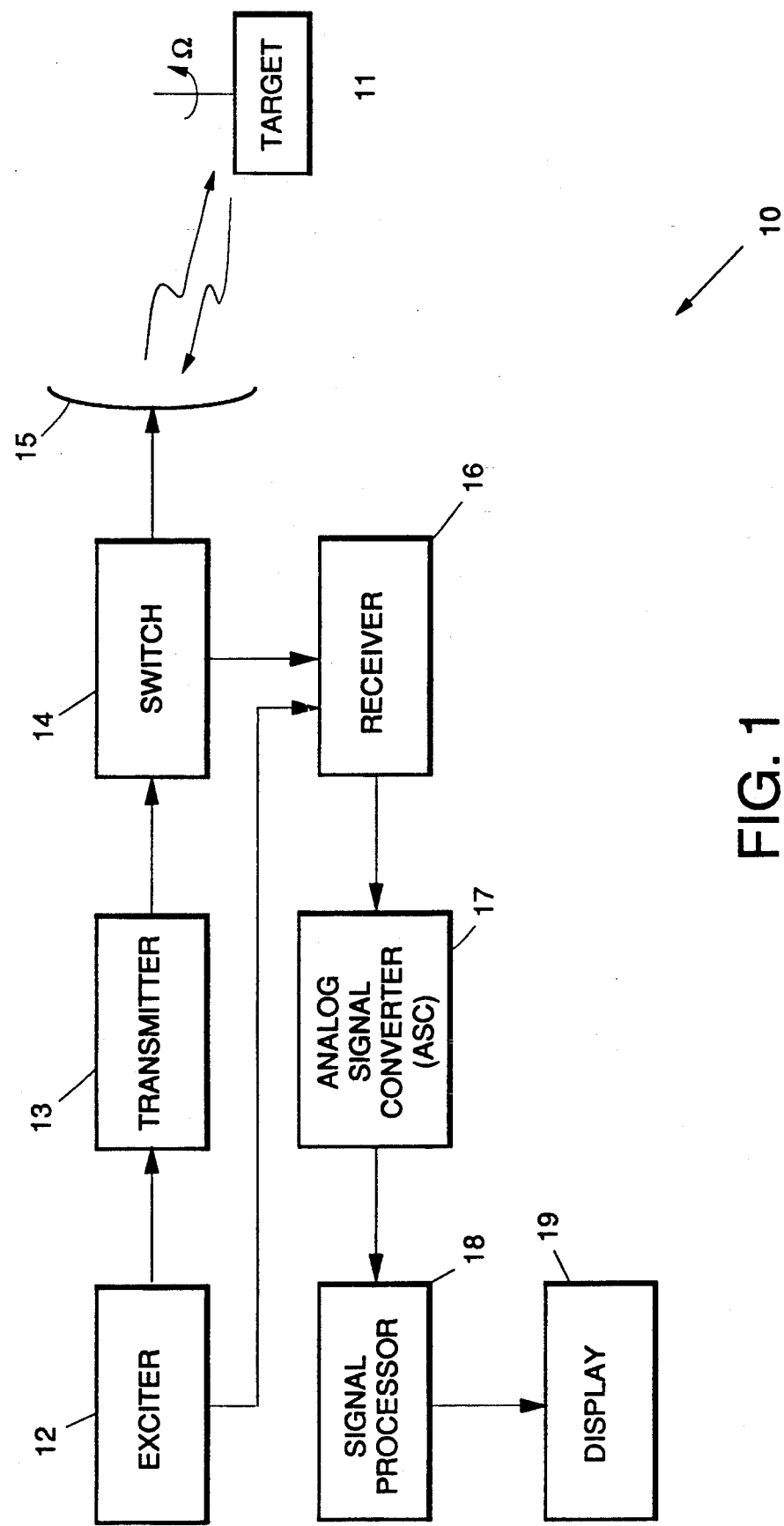
FIG. 1 illustrates an inverse synthetic aperture radar system employing the apparatus and method of the present invention.

FIG. 1 illustrates an inverse synthetic aperture radar system 10 employing the apparatus and method of the present invention. The inverse synthetic aperture radar system 10 is adapted to image a target 11, which is typically an ocean going vessel, for example. The inverse synthetic aperture radar system 10 comprises an exciter 12, a transmitter 13 and a switch 14. The switch is coupled to an antenna 15 (or antennas) that is adapted to transmit and receive energy pulses that are imaged by the inverse synthetic aperture radar system 10. Upon reflection from the target 11, received energy is coupled by way of the antenna 15 and the switch 14 to a receiver 16 and through an analog signal converter (ASC) 17 (an A/D converter with enhancements) to a signal processor 18. The signal processor 18 comprises apparatus that implements the methods of the present invention. The output from the signal processor 18 is coupled to a radar display 19 for viewing by an operator. The components of the inverse synthetic aperture radar system 10 are generally well known in the art and will not be described in detail. The signal processor 18, however, is the heart of the present invention and will be described in more detail with respect to FIG. 2 below.

Figure 2:
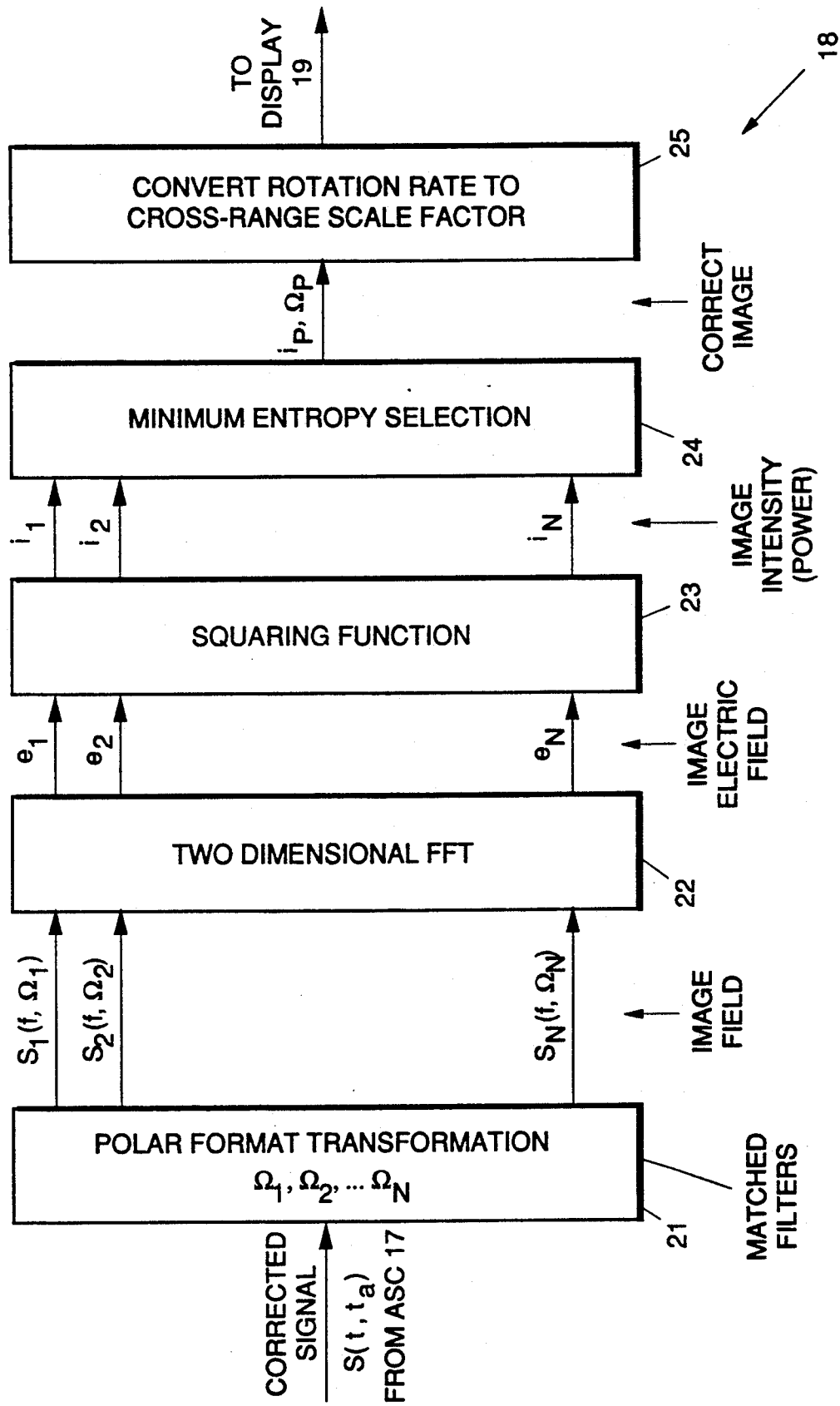
FIG. 2 is a detailed illustration of the signal processor that implements the method of the present invention.

FIG. 2 is a detailed illustration of the signal processor 18 that implements the methods of the present invention, and FIG. 2 also illustrates the steps in the processing methods of the present invention. A corrected signal from the ASC 17 is applied to the signal processor 18. The signal processor 18 implements an algorithm that comprises a plurality of processing steps that determine a cross-range scale factor that is applied to the display 19 for use by the operator. The components and processing steps comprising the signal processor 18 and present method are as follows.

A corrected signal $(S(t, t_a))$ from the ASC 17 is applied to a plurality of matched filters 21 that perform a transformation of the image data into polar format. The polar format image data is represented by the polar format signal $S_n(\Omega_n)$, $n=1, \ldots N$. A two-dimensional Fourier transform 22 (FFT) is performed on each polar format signal $S_n(\Omega_n)$ which produces a plurality of image electric field values ($e_n$, $n=1, \ldots N$). The plurality of image field values are processed by means of an absolute squaring function in processing block 23 to produce a plurality of image intensity values ($i_n$, n=1, ... N), and then a minimum entropy value ($i_p$, $\Omega_p$) is determined by means of computational block 24, using a comparator circuit, for example. The minimum entropy value is used to convert the rotation rate associated therewith into a cross-range scale factor, by means of computational block 25. The output of the computational block 25 is coupled to the display and the cross-range scale factor is displayed thereon.

Figure 3C:
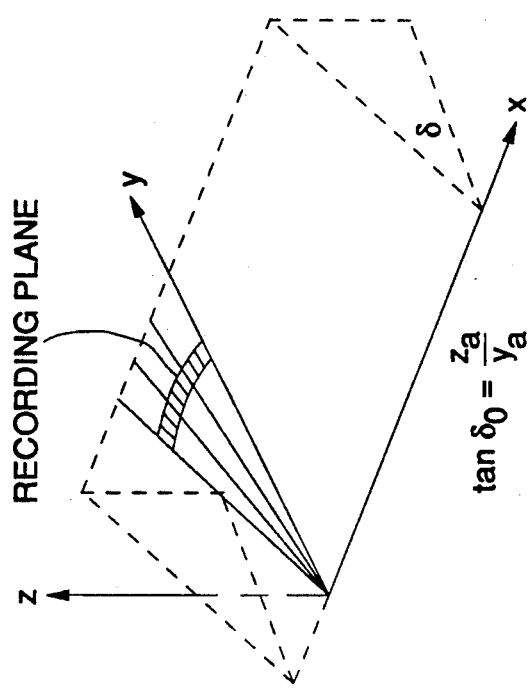
FIGS. 3a, 3b and 3c show target geometry, data geometry and recording geometry, respectively, that are useful in explaining the polar format processing of the present invention.
Figure 3B:
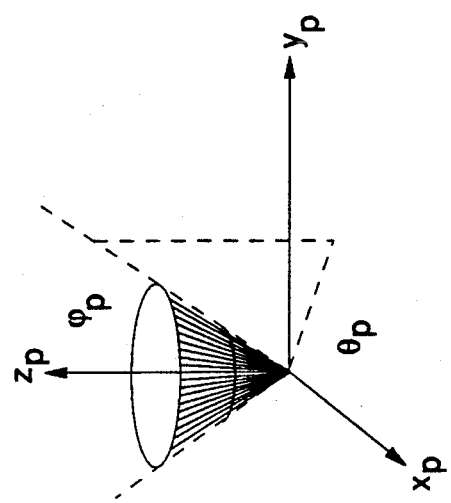
Figure 3A:
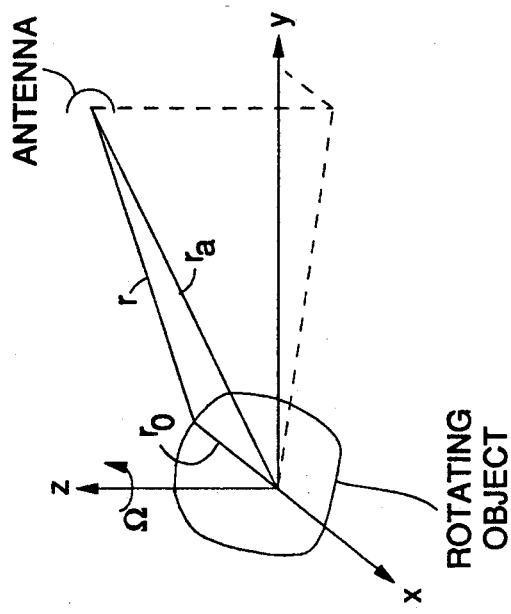

FIGS. 3a, 3b and 3c show the target geometry, the data geometry and the recording geometry, respectively, employed in the apparatus and method of the present invention. FIGS. 3a, 3b and 3c are useful in explaining the polar format processing of the present invention. FIG. 3a shows the geometry relating to the target 11 wherein the target 11 is rotating about the z axis at a rotational rate equal to $\Omega$. The distances to he target 11, to the center of a reference coordinate system, and the radius of the target 11 are shown by r, $r_a$ and $r_o$, respectively. FIG. 3b shows the data geometry showing the various angles of the received data with respect to the coordinate system. FIG. 3c shows the recording geometry associated with recording received ISAR signals that are to be processed to produce an image.

Figure 4:
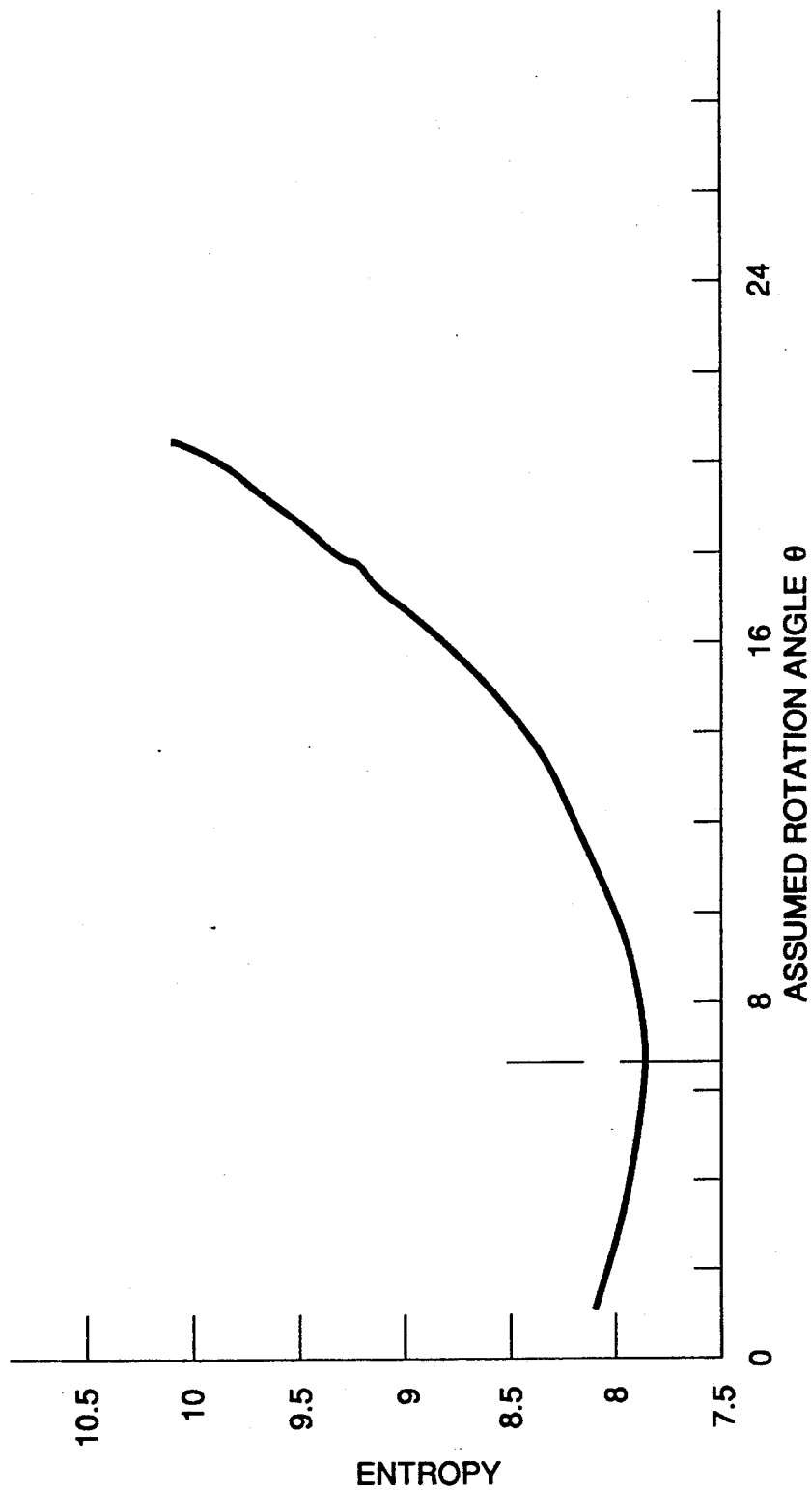
FIG. 4 is a plot of image entropy versus assumed rotation rate used in the polar format processing of the present invention.

FIG. 4 is a plot of image entropy versus assumed rotation rate used in the polar format processing of the present invention. As can be seen in FIG. 4, the entropy curve typically has one minimum which is employed as a reference point from which the cross-range scale factor is computed. The present invention determines the cross-range scale factor in a ISAR image from its received signal. A plurality of estimates of the rotation rate of the target 11 imaged by the radar system 10 are used as an input to polar-format processing of the ISAR signal. The plurality of entropy values are computed which are shown by the plot of the image entropy versus rotation rate in FIG. 4. The rotation rate for which the entropy is minimum is calculated from this plot. The cross-range scale factor is then determined by using the rotation rate where entropy is the minimum as the estimated rotation rate of the target 11.

The "minimum entropy-polar format" technique of the present invention provides one method of determining the cross-range scale factor. Results obtained on a calibrated 3-D target validate this approach in the case of uniform-single axis motion.

The image entropy is given by the equation $$S = - \sum_{i=1}^{M} I_i \log I_i$$

where $I_i$ is the intensity of the $i^{th}$ image pixel, and M is the total number of image pixels.

The filter function of the radar system 10 is such that the radar sends out a series of pulses S(t-N$\Delta$t) where $\Delta$t is the time between successive pulses, N is the $N^{th}$ pulse, t is the time during the pulse. S(t) may alternatively be written as S(f) where S is the amplitude of the frequency component f.

The receiver records the return from the Nth pulse as S(f, $\Omega_p$t), where f is the return from the frequency component f of the pulse, $\Omega_p$ is the assumed target rotation rate, and t is the N$\Delta$t time from the $N^{th}$ pulse. This return signal is recorded in polar format as is indicated in FIG. 2

Data is converted to an image by a two-dimensional Fourier transform (FFT) operation in the FFT 22, and an amplitude square operation in processing block 23 before display. If there is a relative translational motion between the radar system 10 and the target 11, then the data is multiplied by a quadratic phase correction term before recording in the polar format. The quadratic phase correction term is given by the equation:

$$\exp\left( \frac{-i2\pi v_a^2 t_a^2}{\lambda R} \right).$$

The entropy of the image $I_p$ for different values of $\Omega_p$ i are calculated. The image I with the lowest entropy is associated with the correct value of $\Omega$ and is the image that is displayed.

Data was collected on a 3-D test target specially designed to evaluate the "minimum entropy-polar format" algorithm implemented by the present invention. This target 11 was a closed box with 3$\lambda$ cylinders placed on its surface which acted as point scatterers. In collecting data, the target 11 was mounted on a low radar cross section pole and rotated. The depression angle of the target 11 was 20° and the data was taken at 37.5 GHz with a 5 GHz bandwidth FM-CW pulse. A two dimensional FFT of the data, with respect to angle and frequency, provided a ISAR image of the test target 11.

The assumptions behind the "polar format-minimum entropy" technique are (1) the best image is obtained when the assumed rotational rate is the same as the actual rotational rate when polar-format processing is employed and (2) the image entropy is a minimum at the best focus. The data was collected at a uniform rate and a total angular span of 6.40° was used for the data selected for processing. The image entropy was calculated for images processed for different assumed angles of rotation. A plot of the image entropy vs angle of rotation is displayed in FIG. 4 and indicates that the entropy approaches a minimum at the correct assumed angle of rotation. For this particular data set, it therefore appears that the "minimum entropy—polar format" technique provides a good estimate of the rotation velocity or equivalently, the cross-range scale factor and thus the true length of a ship.

The mathematical justification for the conversion equation that produces the cross range scale factor with no relative translational motion is provided below. For a one-dimensional calculation, the field reflected from a target is given by the equation:

$$a(x)e^{2ikx \sin(\theta)}$$

where a(x) is the target reflectivity, R=2$\pi$/$\lambda$, x is the cross-range coordinate, and $\theta$ is the angle wavefront makes with the normal. For small angles, $\theta$ is approximately equal to $\Omega$t. The signal detected by the radar is given by the equation:

$$S(t) = \int_{?}^{?} a(x)e^{2ikx\Omega t}.$$

The image formed is given by the equation:

$$e(t_0) = \int_{?}^{?} S(t)e^{-2\pi/\lambda(t\Omega_0)} = \int_{?}^{?} a(x)e^{2ikx\Omega t}e^{-k+t\Omega} dt = a(t_0/2\Omega).$$

The cross range scale factor is 2Ω, where Ω is the rotation rate of the target. Alternatively, the cross range scale factor is αΩ, where the proportionality constant α is a function of the Fourier transform variable.

Thus there has been described a new and improved apparatus and methods of determining a displayable cross-range scale factor that is indicative of the relative size of objects imaged by an inverse synthetic aperture radar. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. Apparatus for processing inverse synthetic aperture radar signals to provide a cross-range scale factor that is indicative of the relative size of objects imaged and displayed by an inverse synthetic aperture radar system, said apparatus comprising:

means for matched filtering the inverse synthetic aperture radar signals at each of a plurality of selected rotation rates to produce a plurality of matched filtered signals;

means for integrating each of the plurality of matched filtered signals to produce a respective plurality of entropy values at the plurality of selected rotation rates;

means for selecting a minimum entropy value from the plurality of entropy values;

means for converting the minimum entropy value into a cross-range scale factor; and means for displaying the cross-range scale factor on a radar display of the inverse synthetic aperture radar, which scale factor provides an indication of the relative size of objects imaged by the inverse synthetic aperture radar.

2. Apparatus for processing inverse synthetic aperture radar signals to provide a cross-range scale factor that is indicative of the relative size of objects imaged and displayed by an inverse synthetic aperture radar, said apparatus comprising:

means for processing a plurality of inverse synthetic aperture radar signals to convert them to polar format radar signals comprising frequency and rotation rate;

means for performing a two-dimensional Fourier transform to convert the polar format radar signals into a series of images;

means for determining the best image based upon a predetermined image quality criterion; and means for converting the rotation rate associated with the best image into a cross-range scale factor for display using a predetermined transformation equation.

3. The apparatus of claim 2 wherein the means for determining the best image comprises means for determining the image having the lowest entropy value.

4. A method of processing inverse synthetic aperture radar signals to provide a cross-range scale factor that is indicative of the relative size of objects imaged by an inverse synthetic aperture radar, said method comprising the steps of:

matched filtering the inverse synthetic aperture radar signals at each of a plurality of selected rotation rates $\Omega_N$, $N=1, \ldots n$ to produce a plurality of matched filtered signals;

integrating each of the plurality of matched filtered signals to produce a respective plurality of entropy values at the plurality of selected rotation rates;

selecting a minimum entropy value from the plurality of entropy values;

converting the minimum entropy value into a cross-range scale factor; and displaying the cross-range scale factor on a radar display of the inverse synthetic aperture radar, which scale factor provides an indication of the relative size of objects imaged by the inverse synthetic aperture radar.

5. A method of processing inverse synthetic aperture radar signals to provide a cross-range scale factor that is indicative of the relative size of objects imaged by an inverse synthetic aperture radar, said method comprising the steps of:

processing a plurality of inverse synthetic aperture radar signals to convert them to polar format radar signals comprising frequency and rotation rate;

performing a two-dimensional Fourier transform to convert the polar format radar signals into a series of images;

determining the best image based upon a predetermined image quality criterion; and converting the rotation rate associated with the best image into a cross-range scale factor for display using a predetermined transformation equation.

6. The method of claim 5 wherein the step of determining the best image comprises the step of determining the image having the lowest entropy value.

* * * * *